United States Patent
Debusmann et al.

(10) Patent No.: US 11,533,298 B2
(45) Date of Patent: Dec. 20, 2022

(54) MESSAGING CONTROLLER FOR ANONYMIZED COMMUNICATION

(71) Applicant: SAP SE, Walldorf (DE)

(72) Inventors: Ralph Debusmann, Ludwigsburg (DE); Christian Martick, Berlin (DE)

(73) Assignee: SAP SE, Walldorf (DE)

( * ) Notice: Subject to any disclaimer, the term of this patent is extended or adjusted under 35 U.S.C. 154(b) by 787 days.

(21) Appl. No.: 16/358,441

(22) Filed: Mar. 19, 2019

(65) Prior Publication Data

US 2020/0304472 A1    Sep. 24, 2020

(51) Int. Cl.
| | |
|---|---|
| *H04L 9/40* | (2022.01) |
| *H04L 51/02* | (2022.01) |
| *H04L 51/046* | (2022.01) |
| *G06F 16/33* | (2019.01) |
| *G06F 16/903* | (2019.01) |
| *G06F 16/9535* | (2019.01) |
| *H04L 67/306* | (2022.01) |

(52) U.S. Cl.
CPC ...... *H04L 63/0421* (2013.01); *G06F 16/3334* (2019.01); *G06F 16/3347* (2019.01); *G06F 16/90344* (2019.01); *G06F 16/9535* (2019.01); *H04L 51/02* (2013.01); *H04L 51/046* (2013.01); *H04L 67/306* (2013.01); *H04L 2209/04* (2013.01); *H04L 2209/42* (2013.01)

(58) Field of Classification Search
None
See application file for complete search history.

(56) References Cited

U.S. PATENT DOCUMENTS

| | | | |
|---|---|---|---|
| RE41,416 E * | 7/2010 | Liu | H04M 3/42008 370/352 |
| 9,495,391 B1 * | 11/2016 | Koh | G06Q 50/01 |
| 9,805,373 B1 * | 10/2017 | Epelman-Wang | G06Q 10/101 |
| 10,380,516 B1 * | 8/2019 | Kislaki | G06Q 10/063112 |
| 10,594,757 B1 * | 3/2020 | Shevchenko | G06F 40/186 |
| 11,379,548 B2 * | 7/2022 | Ho | G06N 3/08 |
| 11,386,259 B2 * | 7/2022 | Heckel | G06F 21/6245 |

(Continued)

OTHER PUBLICATIONS

Rosenberg et al.; RFC 3261—SIP: Session Initiation Protocol; 2002; Retrieved from the Internet https://www.rfc-editor.org/rfc/pdfrfc/rfc3261.txt.pdf; pp. 1-269, as printed. (Year: 2002).*

*Primary Examiner* — Michael W Chao
(74) *Attorney, Agent, or Firm* — Mintz Levin Cohn Ferris Glovsky and Popeo, P.C.

(57) ABSTRACT

A method may include receiving, from a first client, a first message. The first message may be matched to a second user based on a similarity between a first keyword included in the first message and a second keyword included in a profile of a second user. The first keyword may be determined to be similar to the second keyword based on a distance between a first vector representation of the first keyword and a second vector representation of the second keyword not exceeding a threshold value. In response to the first message being matched with the second user, the first message may be sent to a second client associated with the second user. In response to receiving, from the second client, a second message responsive to the first message, the second message may be sent to the first client. Related systems and articles of manufacture are also provided.

17 Claims, 6 Drawing Sheets

(56) References Cited

U.S. PATENT DOCUMENTS

| | | | |
|---|---|---|---|
| 11,392,901 B2* | 7/2022 | Khwaja | G06F 16/95 |
| 2002/0087520 A1* | 7/2002 | Meyers | G06F 16/335 |
| 2003/0004909 A1* | 1/2003 | Chauhan | G06N 5/043 |
| | | | 706/45 |
| 2005/0027805 A1* | 2/2005 | Aoki | H04L 51/04 |
| | | | 709/206 |
| 2006/0206578 A1* | 9/2006 | Heidloff | G06Q 10/107 |
| | | | 709/213 |
| 2006/0229995 A1* | 10/2006 | Ferraro | G06Q 20/383 |
| | | | 705/74 |
| 2008/0021884 A1* | 1/2008 | Jones | G06F 16/951 |
| 2008/0040188 A1* | 2/2008 | Klausmeier | G06Q 10/1093 |
| | | | 705/7.18 |
| 2008/0303811 A1* | 12/2008 | Van Luchene | A63F 13/79 |
| | | | 345/419 |
| 2010/0070554 A1* | 3/2010 | Richardson | G06Q 10/06 |
| | | | 709/202 |
| 2010/0125478 A1* | 5/2010 | Bisht | H04W 4/33 |
| | | | 705/7.19 |
| 2010/0207812 A1* | 8/2010 | Demirdjian | G06Q 30/08 |
| | | | 705/1.1 |
| 2012/0078906 A1* | 3/2012 | Anand | G06Q 10/06 |
| | | | 707/737 |
| 2013/0232213 A1* | 9/2013 | Bustamente | H04W 4/21 |
| | | | 709/204 |
| 2013/0238708 A1* | 9/2013 | Bustamente | G06Q 10/1095 |
| | | | 709/204 |
| 2014/0074951 A1* | 3/2014 | Misir | H04L 12/1827 |
| | | | 709/206 |
| 2014/0082087 A1* | 3/2014 | Bustamente | H04L 65/403 |
| | | | 709/204 |
| 2015/0319203 A1* | 11/2015 | Jeremias | G06Q 30/0641 |
| | | | 715/753 |
| 2016/0246936 A1* | 8/2016 | Kahn | G16H 40/63 |
| 2017/0286972 A1* | 10/2017 | Hausler | G06Q 30/016 |
| 2018/0197072 A1* | 7/2018 | Hausler | G06F 40/279 |
| 2018/0336268 A1* | 11/2018 | Xu | G06F 40/295 |
| 2020/0151253 A1* | 5/2020 | Wohlwend | G06N 3/08 |
| 2020/0184307 A1* | 6/2020 | Lipka | G06N 3/088 |
| 2021/0042830 A1* | 2/2021 | Burke | G06Q 30/0631 |
| 2022/0116349 A1* | 4/2022 | Warshaw | H04L 51/226 |
| 2022/0179665 A1* | 6/2022 | Rathod | G06F 9/451 |

* cited by examiner

MESSAGING CONTROLLER FOR ANONYMIZED COMMUNICATION

TECHNICAL FIELD

The subject matter disclosed herein relates generally to computing networks and more specifically to anonymized communications in a computing network.

BACKGROUND

A network of computing devices may be interconnected via one or more wired and/or wireless networks including, for example, a local area network (LAN), a virtual local area network (VLAN), a wide area network (WAN), a public land mobile network (PLMN), the Internet, and/or the like. The computing devices in the network may share resources including, for example, servers, storage, applications, services, and/or the like. Furthermore, the computing devices in the network may perform communication tasks. For example, one or more of the computing devices may participate in chats, exchange short messaging service (SMS) messages, and/or the like.

SUMMARY

Methods, systems, and articles of manufacture, including computer program products, are provided for anonymized communications. In one aspect, there is provided a system that includes at least one data processor and at least one memory. The at least one memory may store instructions that result in operations when executed by the at least one data processor. The operations may include: receiving, from a first client, a first message; matching, based at least on a similarity between a first keyword included in the first message and a second keyword included in a profile of a second user, the first message with the second user, the first keyword being determined to be similar to the second keyword based at least on a distance between a first vector representation of the first keyword and a second vector representation of the second keyword not exceeding a threshold value; in response to the first message being matched with the second user, sending, to a second client associated with the second user, the first message; and in response to receiving, from the second client, a second message responsive to the first message, sending, to the first client, the second message.

In some variations, one or more features disclosed herein including the following features can optionally be included in any feasible combination. The first message may be sent to a third party platform for enrichment prior to sending the first message to the second client. The third party platform may be an exchange server, and wherein the first message is enriched by the third party platform to include scheduling data associated with the first user and/or the second user.

In some variations, the first message may be further matched with a first group of users including the second user and a third user. The first message may be further sent to a third client associated with the third user. In response to receiving, from the third user, a third message responsive to the first message, the third message may be sent to the first client. The first user may be part of a second group of users that includes the first user and a fourth user. The third message may be further sent to a fourth client associated with the fourth user.

In some variations, the first vector representation of the first keyword may be generated to correspond to a first context associated with the first keyword. The second vector representation of the second keyword may be generated to correspond to a second context associated with the second keyword. The first context may correspond to a first plurality of keywords that accompany the first keyword in a corpus of text. The second context may correspond to a second plurality of keywords that accompany the second keyword in the corpus of text. The first keyword and the second keyword may be determined to be similar based at least on a similarity between the first context and the second context. The first vector representation and the second vector representation may be generated by at least applying a word2vec word embedding technique.

In some variations, the first message may be matched with the second user by at least querying a user store storing a plurality of user profiles.

In some variations, the first user may be identified as a recipient of the second message based at least on metadata associated with the second message. The metadata associated with the second message may include a message thread identifier associated with the second message.

In some variations, the first message and the second message may be exchanged between the first client and the second client without revealing a respective identify of the first user and the second user.

In another aspect, there is provided a method for anonymized communications. The method may include: receiving, from a first client, a first message; matching, based at least on a similarity between a first keyword included in the first message and a second keyword included in a profile of a second user, the first message with the second user, the first keyword being determined to be similar to the second keyword based at least on a distance between a first vector representation of the first keyword and a second vector representation of the second keyword not exceeding a threshold value; in response to the first message being matched with the second user, sending, to a second client associated with the second user, the first message; and in response to receiving, from the second client, a second message responsive to the first message, sending, to the first client, the second message.

In some variations, one or more features disclosed herein including the following features can optionally be included in any feasible combination. The method may further include sending, to a third party platform, the first message for enrichment prior to sending the first message to the second client. The third party platform may be an exchange server. The first message may be enriched by the third party platform to include scheduling data associated with the first user and/or the second user.

In some variations, the first message may be further matched with a first group of users including the second user and a third user. The first message may be further sent to a third client associated with the third user. The method may further include in response to receiving, from the third user, a third message responsive to the first message, sending, to the first client, the third message. The first user may be part of a second group of users that includes the first user and a fourth user. The third message may be further sent to a fourth client associated with the fourth user.

In some variations, the first vector representation of the first keyword may be generated to correspond to a first context associated with the first keyword. The second vector representation of the second keyword may be generated to correspond to a second context associated with the second keyword. The first context may correspond to a first plurality of keywords that accompany the first keyword in a corpus of text. The second context may correspond to a second plurality of keywords that accompany the second keyword in the corpus of text. The first keyword and the second keyword may be determined to be similar based at least on a similarity between the first context and the second context. The first vector representation and the second vector representation may be generated by at least applying a word2vec word embedding technique.

In some variations, the first message and the second message may be exchanged between the first client and the second client without revealing a respective identify of the first user and the second user.

In another aspect, there is provided a computer program product for anonymized communications. The computer program product may include a non-transitory computer readable medium storing instructions. The instructions may cause operations when executed by at least one data processor. The operations may include: receiving, from a first client, a first message; matching, based at least on a similarity between a first keyword included in the first message and a second keyword included in a profile of a second user, the first message with the second user, the first keyword being determined to be similar to the second keyword based at least on a distance between a first vector representation of the first keyword and a second vector representation of the second keyword not exceeding a threshold value; in response to the first message being matched with the second user, sending, to a second client associated with the second user, the first message; and in response to receiving, from the second client, a second message responsive to the first message, sending, to the first client, the second message.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a network switch, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

Computing devices in a network may perform communication tasks including for example, participate in chats, exchange short messaging service (SMS) messages, and/or the like. However, conventional communication protocols do not allow participants to communicate anonymously, for example, without revealing the identity of each participant. As such, in some example embodiments, a messaging controller may be configured to broker the exchange of messages between two or more users and/or groups of users such that the participants in a message exchange may communicate anonymously. For example, the messaging controller may respond to a first message from a first user at a first client by matching the first user with at least a second user at a second client. The messaging controller may further relay the first message from the first user at the first client to the second user at the second client without revealing, to the second user, the first user as the source of the message. Moreover, the messaging controller may relay, back to the first user at the first client, a second message from the second user responding to the first message from the first user without revealing, to the first user, the second user as the source of the message. Because the messaging controller serves as an intermediary between the first user at the first client and the second user at the second client, the first user's and the second user's participation in the message exchange, including their respective identities, may remain transparent to on another.

Figure 1:
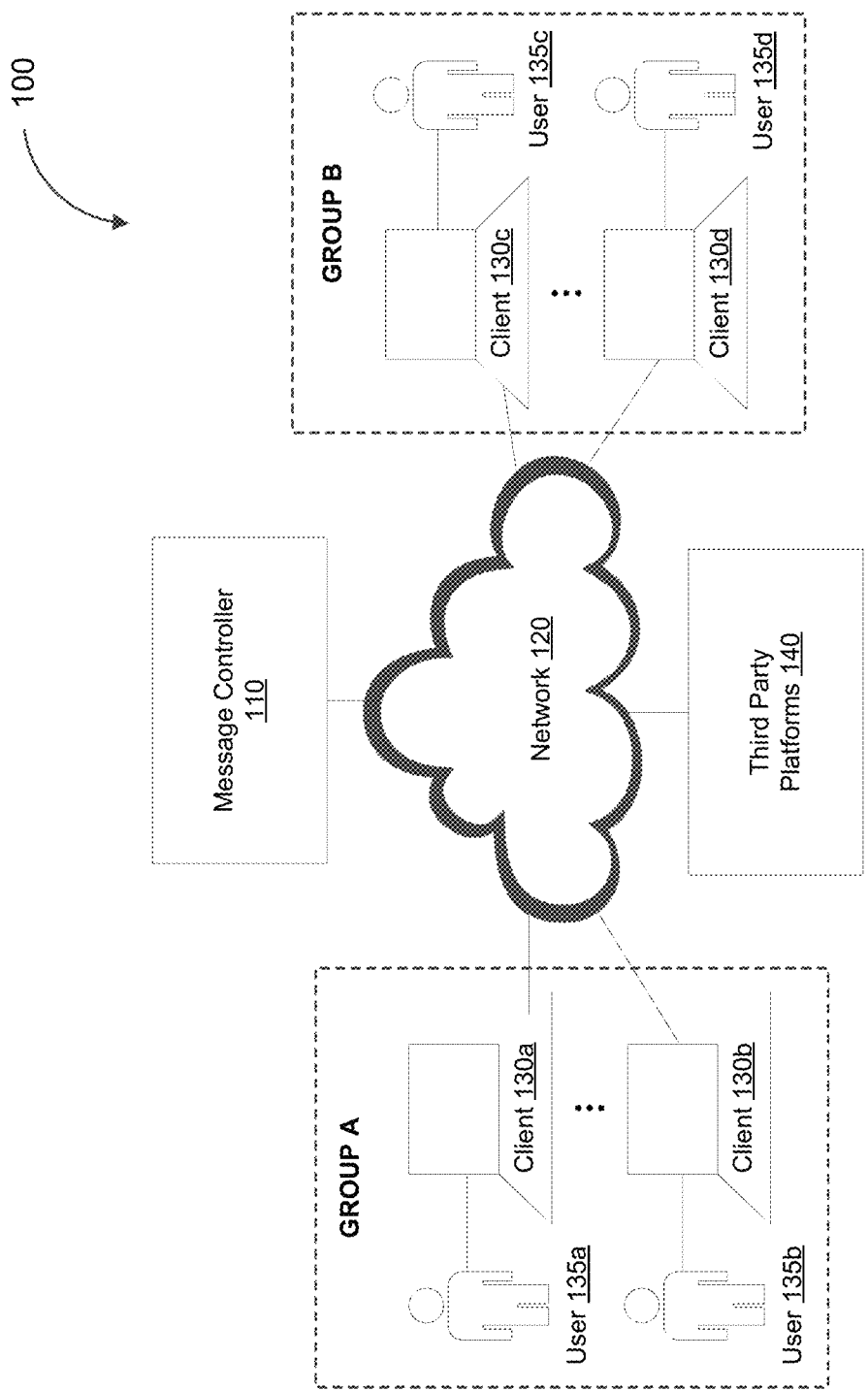
FIG. 1 depicts a system diagram illustrating an anonymized communications system, in accordance with some example embodiments.

FIG. 1 depicts a system diagram illustrating an anonymized communications system 100, in accordance with some example embodiments. Referring to FIG. 1, the anonymized communications system 100 may include a messaging controller 110 that is communicatively coupled, via a network 120, with a plurality of clients including, for example, a first client 130a, a second client 130b, a third client 130c, a fourth client 130d, and/or the like. The network 120 may be any wired and/or wireless network including, for example, a local area network (LAN), a virtual local area network (VLAN), a wide area network (WAN), a public land mobile network (PLMN), the Internet, and/or the like. The first client 130a, the second client 130b, the third client 130c, and/or the fourth client 130d may be any processor-based device including, for example, a workstation, a desktop computer, a laptop computer, a tablet computer, a mobile device, a wearable apparatus, and/or the like.

In some example embodiments, the messaging controller 110 may be configured to broker the exchange of messages between the first client 130a, the second client 130b, the third client 130c, and/or the fourth client 130d. The messaging controller 110 may serve as an intermediary between the a first user 135a at the first client 130a, a second user 135b at the second client 130b, a third user 135c at the third client 130c, and a fourth user 135d at the fourth client 130d such that each user's participation in a message exchange may remain transparent to the other users engaged in the message exchange. For example, the messaging controller 110 may receive, from the first user 135a at the first client 130a, a first message. The messaging controller 110 may respond to the first message by at least matching the message with the third user 135c at the third client 130c. The messaging controller 110 may relay the first message to the second client 130b without revealing, to the third user 135c at the third client 130c, the first user 135a as the source of the first message. Furthermore, the messaging controller 110 may relay, back to the first client 130a, a second message from the third user 135c responding to the first message without revealing, to the first user 135a at the first client 130a, the third user 135c as the source of the second message.

Alternatively and/or additionally, the message controller 110 may be configured to broker the exchange of messages between groups of users. For instance, the message controller 110 may serve as an intermediary between Group A, which may include the first user 135a at the first client 130a and the second user 135b at the second client 130b, and Group B, which may include the third user 135c at the third client 130c and the fourth user 135d at the fourth client 130d. Accordingly, the message controller 110 may respond to receiving, for example, a first message from a user in Group A (e.g., the first user 135a at the first client 130a or the second user 135b at the second client 130b) by matching the second message with Group B. Moreover, the message controller 110 may relay the first message from the user in Group A to the users in Group B including, for example, the third user 135c at the third client 130c and the fourth user 135d at the fourth client 130d. The message controller 110 may further relay a second message from one or more of the users in Group B (e.g., the third user 135c at the third client 130c and/or the fourth user 135d at the fourth client 130d) to the users in Group A including, for example, the first user 135a at the first client 130a and the second user 135b at the second client 130b.

In some example embodiments, the content of the messages being exchanged between the first client 130a, the second client 130b, the third client 130c, and/or the fourth client 130d may be modified and/or enriched prior to delivery. As shown in FIG. 1, the message controller 110 may be communicatively coupled with one or more third party platforms 140. For example, the one or more third party platforms 140 may include an exchange server providing electronic mail and/or calendar services. A message, for example, from the first user 135a at the first client 130a may be sent to one or more of the third party platforms 140 for modification and/or enrichment before the message is sent to the third user 135c at the third client 130c. For instance, the message from the first user 130a at the first client 130a may pose a scheduling question. Accordingly, the message controller 110 may forward the message to one or more of the third party platforms 140 such that the one or more third party platforms 140 may modify and/or enrich the content of the message, for example, to include an availability of the first user 135a and/or the third user 135c, before the message is sent to the third user 135c at the third client 130c.

Figure 2:
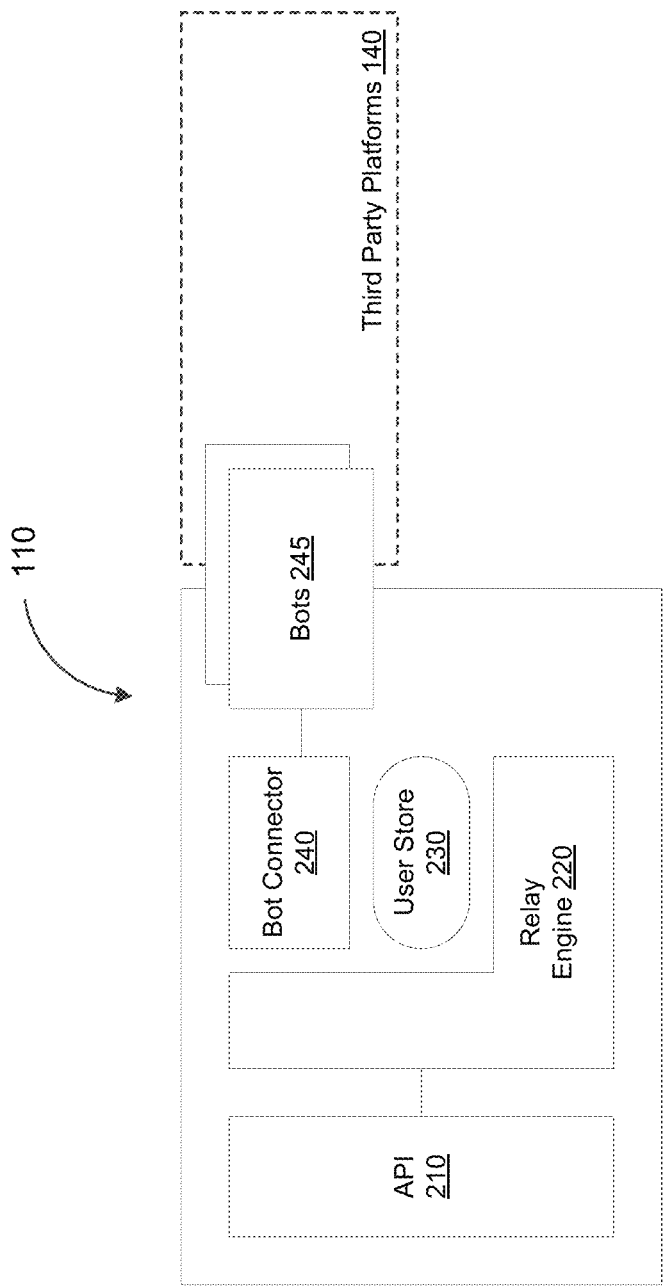
FIG. 2 depicts a block diagram illustrating a message controller, in accordance with some example embodiments.

FIG. 2 depicts a block diagram illustrating the message controller 110, in accordance with some example embodiments. As shown in FIG. 2, the message controller 110 may include an application programing interface (API) 210, a relay engine 220, a user store 230, and a bot connector 240.

In some example embodiments, the application programming interface 210 may serve as an adaptor for the different communication channels between the message controller 110 and the first client 130a, the second client 130b, the third client 130c, and/or the fourth client 130d. For example, the application programming interface 210 may be configured to harmonize the messaging protocols of the different communication channels into one signal format that the relay engine 220 may use to relay the messages being exchanged between the first client 130a, the second client 130b, the third client 130c, and/or the fourth client 130d.

The relay engine 220 may be configured to match a message to one or more users and/or groups of users. For example, the relay engine 220 may respond to the message controller 110 receiving, via the application programing interface 210, a message from the first user 135a at the first client 130a by at least matching the message with the third user 135c at the third client 130c. Alternatively and/or additionally, the relay engine 220 may respond to the message controller 110 receiving, via the application programming interface 210, a message from a user in Group A (e.g., the first user 135a at the first client 130a or the second user 135b at the second client 130b) by at least matching the message with Group B.

In some example embodiments, the relay engine 220 may match a message to one or more users and/or groups of users based on the contents of the message and one or more user profiles stored in the user store 230. For example, the profile of each of the first user 135a, the second user 135b, the third user 135c, and the fourth user 135d may include one or more keywords. The message may be matched to the first user 135a, the second user 135b, the third user 135c, and the fourth user 135d based at least on a similarity between the keywords found in the message and the keywords included in the profiles of the first user 135a, the second user 135b, the third user 135c, and the fourth user 135d.

To determine a match between the message and the profile of at least one of the first user 135a, the second user 135b, the third user 135c, and the fourth user 135d, the relay engine 220 may generate vector representations of one or more keywords in the message as well as vector representations of the keywords included in the profiles of the first user 135a, the second user 135b, the third user 135c, and the fourth user 135d. Using a word embedding technique such as word2vec, the relay engine 220 may generate a vector for each keyword that correspond to a context in which each keyword appears in the plurality of training instruction sequences such as, for example, a large corpus of text. The context of a keyword may correspond to one or more other keywords that may accompany that keyword in the plurality of training instruction sequences. Thus, two similar keywords may appear with approximately the same probability or frequency in a same or similar context (e.g., alongside a same or similar group of keywords). The word2vec embedding technique may therefore maximize the following objective function J(θ) when generating vector representations that preserve similarities between different keywords:

$$J(\theta) = \frac{1}{T}\sum_{t=1}^{T}\sum_{-c \leq j \leq c, j \neq 0} \log p(w_{t+j} | w_t),$$

wherein $p(w_{t+j}|w_t)$ is:

$$p(w_{t+j} | w_t) = \frac{\exp(v'^T_{w_{t+j}} v_{w_t})}{\sum_{w=1}^{W}\exp(v'^T_{w} v_{w_t})},$$

wherein W may be a size of the vocabulary (e.g., distinct keywords) in the plurality of training instruction sequences.

By recognizing the context of each keyword, the relay engine 220 may generate similar vectors for similar keywords. For example, the relay engine 220 may generate similar vectors for the keyword "cars" and the keyword "electric." The relay engine 220 may further determine, based on a distance between the vector representations of the keyword "cars" and the keyword "electric," a similarity between the two keywords. Accordingly, the relay engine 220 may match a message containing the keyword "electric" to a user whose profile includes the keyword "cars." In doing so, the relay engine 220 may determine to relay the message containing the keyword "electric" to the user whose profile includes the keyword "cars."

In some example embodiments, upon matching the message to one or more users and/or groups of users based on the contents of the message and one or more user profiles stored in the user store 230, the relay engine 220 may further determine communication data required to relay the message. For example, the user store 230 may further include, for each of the first user 135a, the second user 135b, the third user 135c, and the fourth user 135d, communication data including, for example, a client application, a user identifier, and/or the like. Accordingly, the relay engine 220 may use the communication data associated with the third user 135c to relay, to the third user 135c at the third client 130c, the message from the first user 135a at the first client 130a. It should be appreciated that the relay engine 220 may conceal, from the first user 135a, the communication data associated with the third user 135c, thereby maintaining the anonymity of the message exchange between the first user 135a at the first client 130a and the third user 135c at the third client 130c.

Referring again to FIG. 2, the relay engine 220 may invoke the bot connector 240 in order to relay a message to one or more users and/or groups of users. For example, the bot connector 240 may send, to the third user 135c at the third client 130c, the message from the first user 135a at the first client 130a. As FIG. 2 shows, the bot connector 240 may be communicatively coupled with one or more bots 245, each of which being configured to interface with a corresponding one of the third party platforms 140. Accordingly, by invoking the bot connector 240, the bot connector 240 may further communicate, via the bots 245, with the one or more third party platforms 140 in order to forward, to the one or more third party platforms 140, the message from the first user 135a at the first client 130a for modification and/or enrichment before the message is sent to the third user 135c at the third client 130c.

Figure 3A:
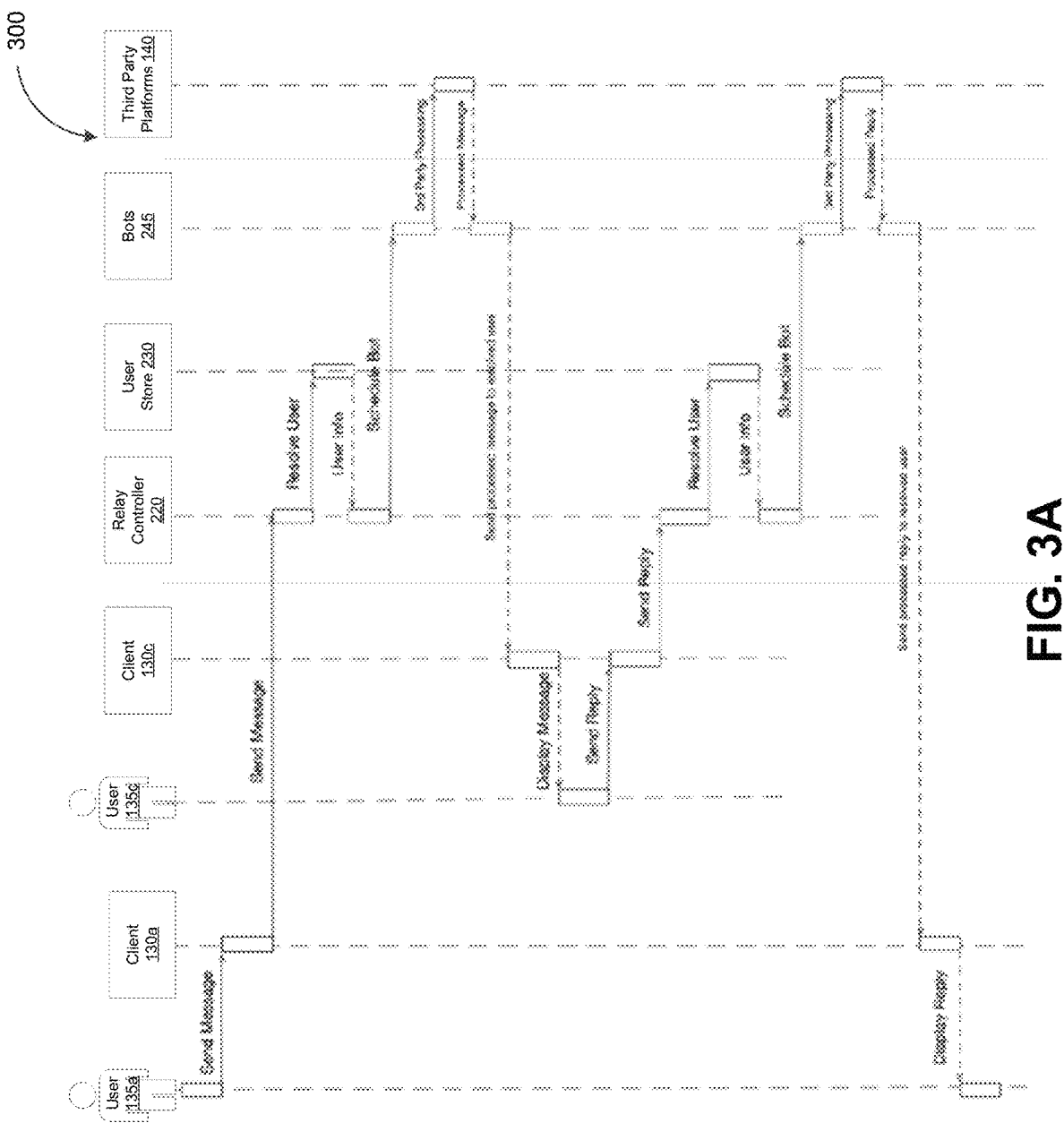
FIG. 3A depicts a sequence diagram illustrating a process for anonymized message exchange between two individual clients, in accordance with some example embodiments.

FIG. 3A depicts a sequence diagram 300 illustrating a process for anonymized message exchange between two individual clients, in accordance with some example embodiments. Referring to FIGS. 1-2 and 3A, the first user 135a at the first client 130a may initiate an anonymized message exchange by sending, via the first client 130a, a first message. The relay engine 220 at the message engine 110 may receive, via the application programing interface 210, the first message from the first user 135a at the first client 130a. In response to receiving the first message from the first user 135a at the first client 130a, the relay engine 220 may match the first message with the third user 135c at the third client 130c. For example, as shown in FIG. 3A, the relay engine 220 may access the user store 230 to access the user profiles of the second user 135b, the third user 135c, and/or the fourth user 135d. Moreover, the relay engine 220 may match the first message from the first user 135a at the first client 130a with the third user 135c at the third client 130c based at least on a similarity between keywords included in the first message and keywords included in the profile of the third user 135c.

In some example embodiments, upon matching the first message from the first user 135a at the first client 130a with the third user 135c at the third client 130c, the relay engine 220 may further retrieve, from the user store 230, communication data required to relay the message to the third user 135c at the third client 130c. The communication data may include, for example, a client application, a user identifier, and/or the like. As FIG. 3A further shows, the relay engine 220 may invoke, via the bot connector 140, one or more of the bots 245. One or more of the bots 245 may forward, to one or more of the corresponding third party platforms 140, the first message for modification and/or enrichment before sending the modified and/or enriched message the third user 135c at the third client 130c. For example, the first message, including the enrichments and/or the modifications from the third party platforms 140, may be displayed at the third client 130c associated with the third user 135c.

Referring again to FIG. 3A, upon receiving the first message from the first user 130a at the first client 130a, the third user 135c at the third client 130c may send a second message in response. The relay controller 220 may receive, again via the application programing interface 210, the second message from the third user 135c at the third client 130c. The relay controller 220 may respond to receiving the second message from the third user 135c at the third client 130c by at least identifying, based at least on metadata associated with the second message (e.g., a message thread identifier and/or the like), the first user 135a as the recipient of the second message. The relay controller 220 may then query the user store 240 to retrieve communication data associated with the first user 135a at the first client 130a, which may be required to relay the second message to the first user 135a at the first client 130a. Moreover, the relay controller 220 may again invoke, for example, via the bot connector 140, one or more of the bots 245. One or more of the bots 245 may forward, to one or more of the corresponding third party platforms 140, the second message for modification and/or enrichment before sending the modified and/or enriched message to the first user 135a at the first client 130a. The second message, including the enrichments and/or the modifications made by the third party platforms 140, may subsequently be sent to and displayed at the first client 130a associated with the first user 135a.

Figure 3B:
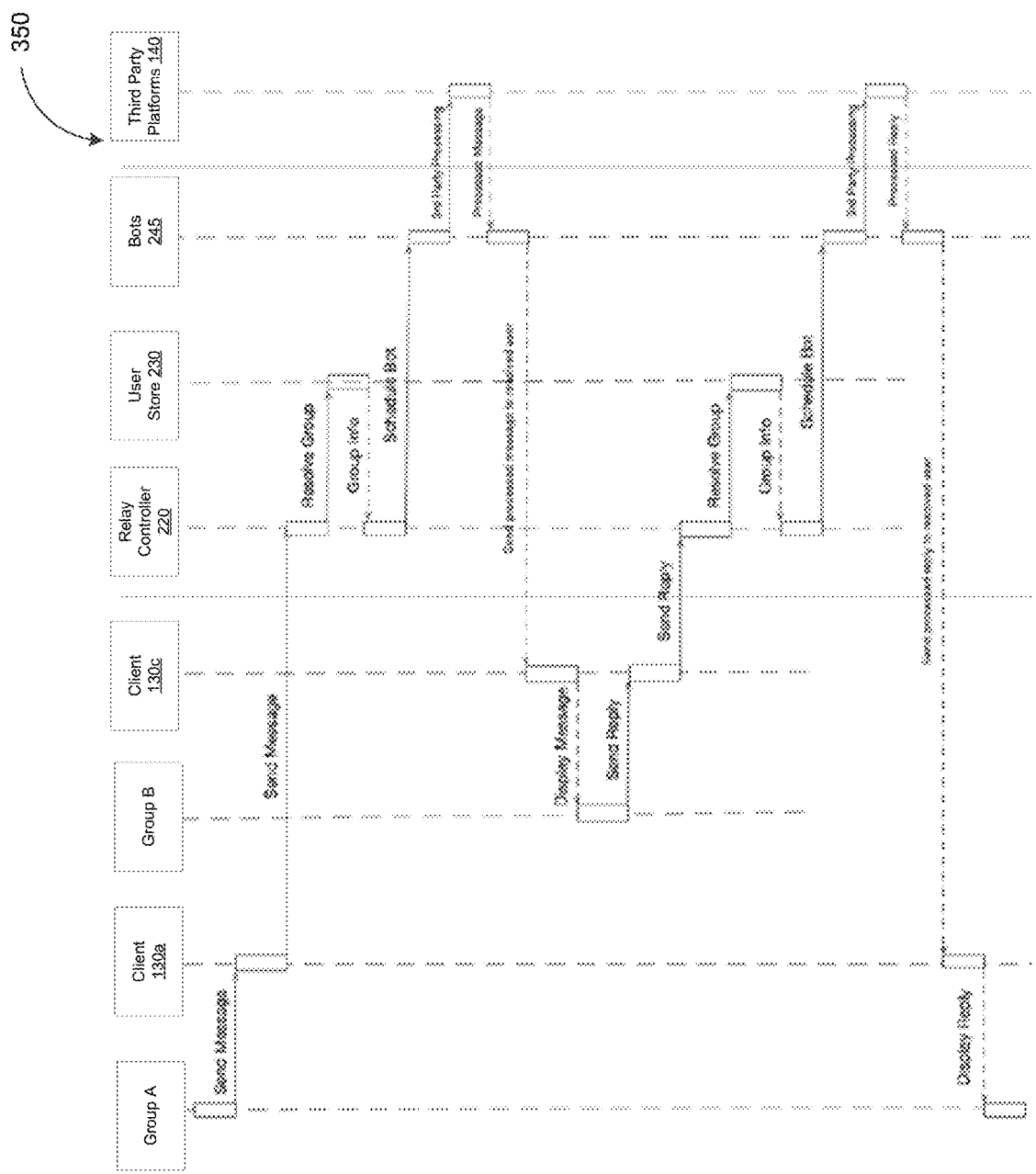
FIG. 3B depicts a sequence diagram illustrating a process for anonymized message exchange between two groups of clients, in accordance with some example embodiments.

FIG. 3B depicts a sequence diagram 350 illustrating a process for anonymized message exchange between two groups of clients, in accordance with some example embodiments. Referring to FIGS. 1-2 and 3B, users in Group A (e.g., the first user 135a at the first client 130a and the second user 135b at the second client 130b) may engage in an anonymized message exchange with users in Group B (e.g., the third user 135c at the third client 130c and the fourth user 135d at the fourth client 130d). For instance, FIG. 3B shows that the anonymized message exchange between Group A and Group B may be initiated when the first user 135a in Group A sends, via the first client 130a, a first message. The relay engine 220 at the message engine 110 may receive, via the application programing interface 210, the first message from Group A.

In response to receiving the first message from Group A, the relay engine 220 may match the first message with Group B. For example, as shown in FIG. 3B, the relay engine 220 may access the user store 230 to access the user profiles of the second user 135b, the third user 135c, and/or the fourth user 135d. Moreover, the relay engine 220 may match the first message from Group A with the third user 135c and the fourth user 135d in Group B based at least on a similarity between keywords included in the first message and keywords included in the profile of the third user 135c and/or the fourth user 135d. It should be appreciated that membership in Group A and/or Group B may be predefined. Alternatively and/or additionally, the relay engine 220 may identify the second user 135c and the fourth user 135d to form Group B based at least on the profiles of the two users having keywords that are sufficiently similar to the keywords included in the first message.

In some example embodiments, upon matching the first message from Group A with Group B, the relay engine 220 may further retrieve, from the user store 230, communication data required to relay the message to the users in Group B including, for example, the third user 135c at the third client 130c and the fourth user 135d at the fourth client 130d. The communication data may include, for example, the respective client application, user identifier, and/or the like, of the third user 135c and the fourth user 135d. As FIG. 3B further shows, the relay engine 220 may invoke, via the bot connector 140, one or more of the bots 245. One or more of the bots 245 may forward, to one or more of the corresponding third party platforms 140, the first message for modification and/or enrichment before broadcasting the modified and/or enriched message to the users in Group B. For example, the first message, including the enrichments and/or the modifications from the third party platforms 140, may be sent to and displayed at the third client 130c associated with the third user 135c in Group B.

Referring again to FIG. 3B, upon receiving the first message from Group A, one or more of the users in Group B may respond by sending a second message. The relay controller 220 may receive, again via the application programing interface 210, the second message, for example, from the third user 130c at the third client 130c. The relay controller 220 may respond to receiving the second message from Group B by at least identifying Group A as the recipient for the second message. For instance, the relay controller 220 may identify Group A as the recipient for the second message based at least on metadata (e.g., message thread identifier and/or the like) associated with the second message. The relay controller 220 may query the user store 240 to retrieve communication data associated with the users in Group A including, for example, the first user 135a at the first client 130a and the second user 135b at the second client 130b. Moreover, the relay controller 220 may invoke, for example, via the bot connector 140, one or more of the bots 245. One or more of the bots 245 may forward, to one or more of the corresponding third party platforms 140, the second message for modification and/or enrichment before sending the modified and/or enriched message to the users in Group B. For example, FIG. 3B shows the second message, including the enrichments and/or the modifications from the third party platforms 140, may be displayed at the third client 130c associated with the third user 135c from Group B.

Figure 4:
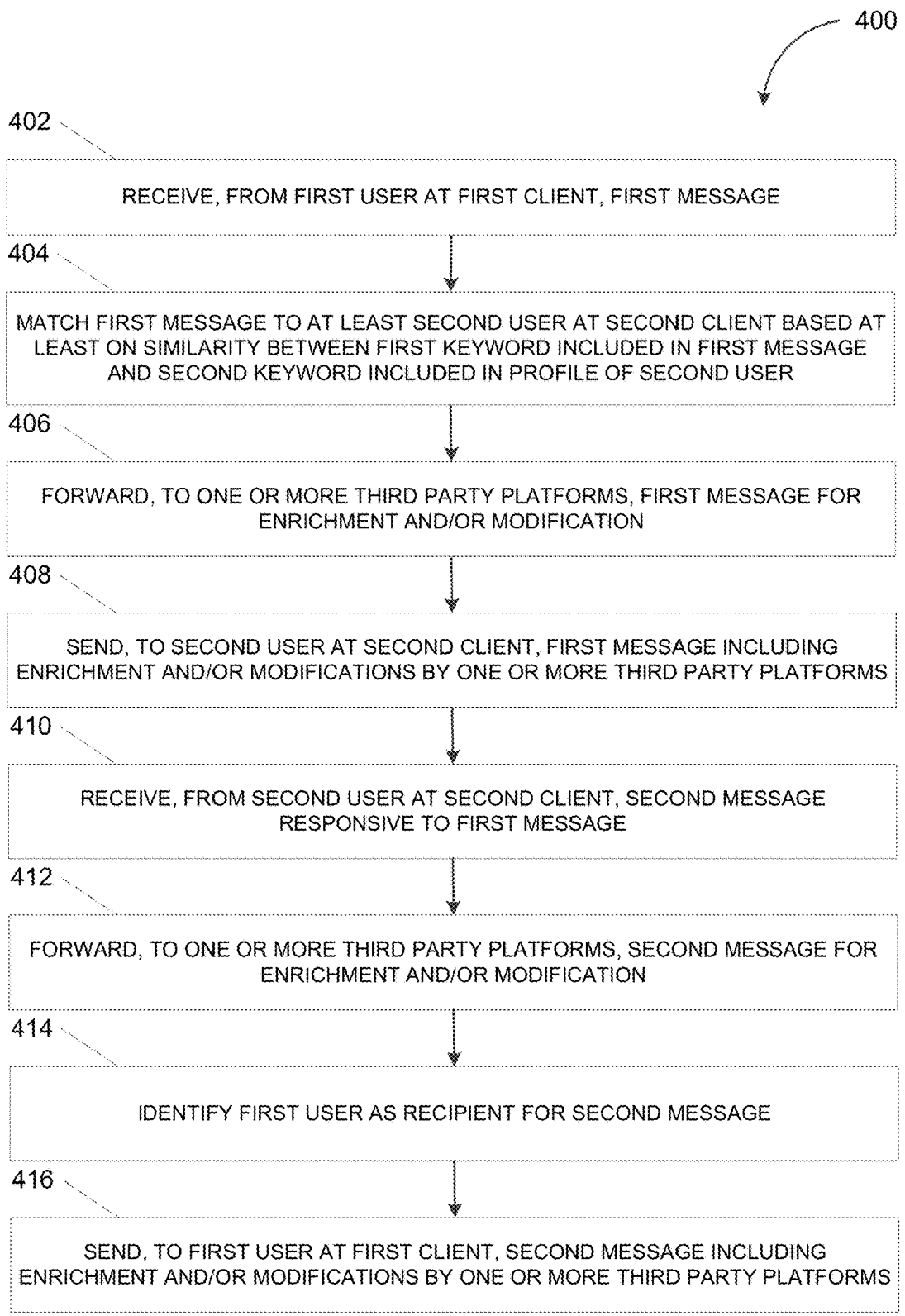
FIG. 4 depicts a flowchart illustrating a process for anonymized communications, in accordance with some example embodiments.

FIG. 4 depicts a flowchart illustrating a process 400 for anonymized communications, in accordance with some example embodiments. Referring to FIGS. 1-2, 3A-B, and 4, the process 400 may be performed by the message controller 110. In some example embodiments, the message controller 110 may perform the process 400 to relay messages between individual users including, for example, the first user 135a at the first client 130a and the second user 135b at the second client 130b. Alternatively and/or additionally, the message controller 110 may perform the process 400 to relay messages between groups of users including, for example, Group A, which may include the first user 135a at the first client 130a and the second user 135b at the second client 130b, and Group B, which may include the third user 135c at the third client 130c and the fourth user 135d at the fourth client 130d.

At 402, the message controller 110 may receive, from a first user at the first client, a first message. For example, the message controller 110 may receive, from the first user 135a at the first client 130a, a first message. As noted, the first user 135a at the first client 130a may be part Group A, which may also include the second user 135b at the second client 130b.

At 404, the message controller 110 may match the first message to at least a second user at a second client based at least on a similarity between a first keyword included in the first message and a second keyword included in a profile of the second user. For example, the message controller 110 may, upon receiving the first message from the first user 135a at the first client 130a, query the user store 240 to at least retrieve the profiles of the second user 135b, the third user 135c, and the fourth user 135d. The message controller 110 may further generate vector representations of one or more keywords in the first message as well as vector representations of the keywords included in the profiles of the second user 135b, the third user 135c, and the fourth user 135d using a word embedding technique such as, for example, word2vec and/or the like.

By recognizing the context of each keyword, the relay engine 220 may generate similar vectors for similar keywords. For instance, the relay engine 220 may generate similar vectors for the keyword "cars" and the keyword "electric." Moreover, the relay engine 220 may determine, based on a distance between the vector representations of the keyword "cars" and the keyword "electric," a similarity between the two keywords. Accordingly, the relay engine 220 may match the first message containing the keyword "electric" to the third user 135c if the profile of the third user 135c includes the keyword "cars." It should be appreciated that in some example embodiments, the third user 135c may be part of Group B, which may include other users (e.g., the fourth user 135d at the fourth client 130d) whose profiles may also include keywords matching the keywords included in the first message from the first user 135a.

At 406, the message controller 110 may forward, to the one or more third party platforms 140, the first message for enrichment and/or modification. For example, the message controller 110 may send the first message, which may pose a scheduling question, to one or more third party platforms 140 including an exchange server providing electronic mail and/or calendar services. The one or more of the third party platforms 140 may modify and/or enrich the content of the first message, for example, to include an availability of the third user 135*c*, before the first message is sent to the third user 135*c* at the third client 130*c*. Alternatively and/or additionally, if the third user 135*c* is part of Group B, the one or more third party platforms 140 may also modify and/or enrich the content of the first message to include an availability of the fourth user 135*d* who is also part Group B prior to the first message being sent to the fourth user 135*d* at the fourth client 130*d*.

At 408, the message controller 110 may send, to the second user at the second client, the first message including the enrichment and/or the modifications by the one or more third party platforms 140. For example, the message controller 110 may send the first message from the first user 135*a* at the first client 130*a*, including the enrichments and/or modifications made by one or more of the third party platforms 140, to the third user 135*c* at the third client 130*c*. Alternatively and/or additionally, the first message, along with the enrichments and/or modifications from the one or more third party platforms 140, may also be sent to the fourth user 135*d* at the fourth client 130*d*, if the first message from the first user 135*a* is being broadcast to the users in Group B.

At 410, the message controller 110 may receive, from the second user at the second client, a second message responsive to the first message. For example, the message controller 110 may receive, from the third user 135*c* at the third client 130*c*, a second message. The second message may be responsive to the first message from the first client 130*a* at the first client 130*a*, even though the third user 135*c* is unaware of the first user 135*a* being the source of the first message or the recipient of the second message. If the message exchange is being conducted between users in Group A and Group B, then it should be appreciated that the message controller 110 may also receive, from the fourth user 135*d* at the fourth client 130*d*, a third message that is also responsive to the first message from the first user 135*a* at the first client 130*a*. The fourth user 135*d* may also be unaware of the first user 135*a* being the source of the first message or the recipient of the third message.

At 412, the message controller 110 may forward, to the one or more third party platforms 140, the second message for enrichment and/or modification. For example, the message controller 110 may forward, to the one or more third party platforms 140, the second message from the third user 135*c* at the third client 130*c* before the second message is sent to the first user 135*a* at the first client 130*a*.

At 414, the message controller 110 may identify the first user as a recipient for the second message. For example, the message controller 110 may identify the recipients of the second message from the third user 135*c* at the third client 130*c* based at least on metadata associated with the second message. The metadata may include, for example, a message thread identifier and/or the like. Accordingly, the message controller 110 may identify the first user 135*a* at the first client 130*a* as a recipient of the second message from the third user 135*c* at the third client 130*c*. Alternatively and/or additionally, if the message exchange is being conducted between users in Group A and Group B, the message controller 110 may also identify, based at least on the metadata associated with the second message, the second user 135*b* at the second client 130*b* as a recipient of the second message from the third user 135*c* at the third client 130*c*.

At 416, the message controller 110 may send, to the first user at the first client, the second message including the enrichment and/or the modifications by the one or more third party platforms 140. For example, the message controller 110 may send the second message from the third user 135*c* at the third client 130*c*, including the enrichments and/or modifications made by one or more of the third party platforms 140, to the first user 135*a* at the first client 130*a*. Alternatively and/or additionally, if the message exchange is being conducted between users in Group A and Group B, the message controller 110 may also send, to the first user 135*a* at the first client 130*a*, the third message from the fourth user 135*d* at the fourth client 130*d*.

Figure 5:
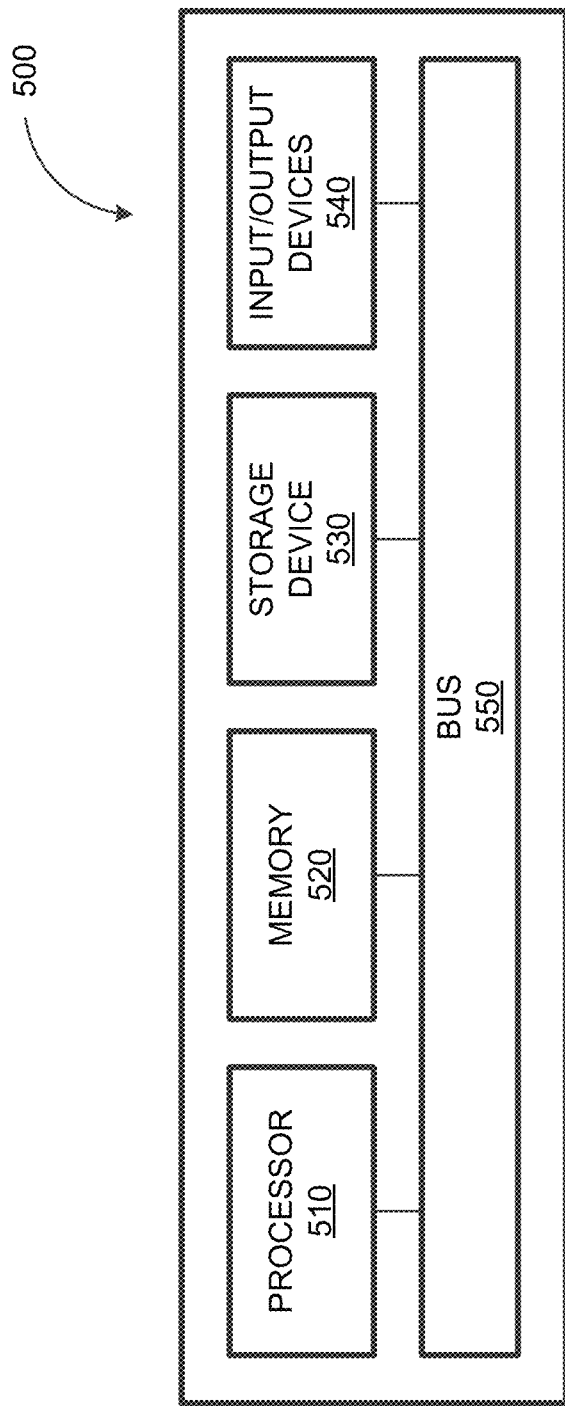
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the message controller 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the message controller 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions, which when executed by the at least one data processor, result in operations comprising:
     receiving, at a messaging controller, a first message from a first client device;
     matching, by the messaging controller and based at least on a similarity between a first keyword included in the first message and a second keyword included in a first profile of a second user, the first message with the second user, the first keyword being determined to be similar to the second keyword based at least on a distance between a first vector representation of the first keyword and a second vector representation of the second keyword not exceeding a threshold value;
     in response to the first message being matched with the second user, enriching the first message by at least
       sending, to a bot connector communicatively coupled with one or more bots interfacing with one or more third party platforms, the first message for modification by the one or more third party platforms, the modification including an availability of the first user and/or the second user, and
       sending, by the messaging controller, the enriched first message to a second client device associated with the second user, the messaging controller sending the first message while concealing a first identity of the first user as a source of the first message, and the messaging controller routing, based at least on a first communication data including a first client application and a first user identifier of the second user, the first message to the second client device while concealing the first communication data of the second user from the first client device; and
     in response to receiving, from the second client device, a second message responsive to the first message, matching, by the messaging controller and based at least on a similarity between a third keyword included in the second message and a fourth keyword included in a second profile of a third user, the second message with the third user;

sending, by the messaging controller, the second message to the first client device and a third client device of the third user, the messaging controller sending the second message while concealing a second identity of the second user as a source of the second message, the messaging controller routing, based at least on a second communication data of the first user and a third communication data of the third user, the second message to the first client device and the third client device while concealing the second communication data or the third communication data to the second client device.

2. The system of claim 1, wherein the one or more third party platforms includes an exchange server that enriches, based at least on a scheduling data associated with the first user and/or the second user, the first message.

3. The system of claim 1, wherein the first user and the third user forms a first group of users.

4. The system of claim 3, further comprising:
in response to receiving, from the first user and/or the third user, a third message responsive to the second message, sending, to the second client device of the second user, the third message.

5. The system of claim 4, wherein the second user is a part of a second group of users that includes the second user and a fourth user, and wherein the third message is further sent to a fourth client device associated with the fourth user.

6. The system of claim 1, wherein the first vector representation of the first keyword is generated to correspond to a first context associated with the first keyword, and wherein the second vector representation of the second keyword is generated to correspond to a second context associated with the second keyword.

7. The system of claim 6, wherein the first context corresponds to a first plurality of keywords that accompany the first keyword in a corpus of text, wherein the second context corresponds to a second plurality of keywords that accompany the second keyword in the corpus of text, and wherein the first keyword and the second keyword are determined to be similar based at least on a similarity between the first context and the second context.

8. The system of claim 6, wherein the first vector representation and the second vector representation are generated by at least applying a word2vec word embedding technique.

9. The system of claim 1, wherein the first message is matched with the second user by at least querying a user store storing a plurality of user profiles.

10. The system of claim 1, further comprising:
identifying, based at least on metadata associated with the second message, the first user as a recipient of the second message, the metadata associated with the second message including a message thread identifier associated with the second message.

11. A computer-implemented method, comprising:
receiving, at a messaging controller, a first message from a first client device;
matching, by the messaging controller and based at least on a similarity between a first keyword included in the first message and a second keyword included in a first profile of a second user, the first message with the second user, the first keyword being determined to be similar to the second keyword based at least on a distance between a first vector representation of the first keyword and a second vector representation of the second keyword not exceeding a threshold value;

in response to the first message being matched with the second user, enriching the first message by at least
sending, to a bot connector communicatively coupled with one or more bots interfacing with one or more third party platforms, the first message for modification by the one or more third party platforms, the modification including an availability of the first user and/or the second user, and
sending, by the messaging controller, the enriched first message to a second client device associated with the second user, the messaging controller sending the first message while concealing a first identity of the first user as a source of the first message, and the messaging controller routing, based at least on a first communication data including a first client application and a first user identifier of the second user, the first message to the second client device while concealing the first communication data of the second user from the first client device; and in response to receiving, from the second client device, a second message responsive to the first message,
matching, by the messaging controller and based at least on a similarity between a third keyword included in the second message and a fourth keyword included in a second profile of a third user, the second message with the third user;
sending, by the messaging controller, the second message to the first client device and a third client device of the third user, the messaging controller sending the second message while concealing a second identity of the second user as a source of the second message, the messaging controller routing, based at least on a second communication data of the first user and a third communication data of the third user, the second message to the first client device and the third client device while concealing the second communication data or the third communication data to the second client device.

12. The method of claim 11, wherein the one or more third party platforms includes an exchange server that enriches, based at least on a scheduling data associated with the first user and/or the second user, the first message.

13. The method of claim 11, wherein the first user and the third user forms a first group of users.

14. The method of claim 13, further comprising:
in response to receiving, from the first user and/or the third user, a third message responsive to the second message, sending, to the second client device of the second user, the third message, the second user being a part of a second group of users that includes the second user and a fourth user, and the third message further being sent to a fourth client device associated with the fourth user.

15. The method of claim 11, wherein the first vector representation of the first keyword is generated to correspond to a first context associated with the first keyword, wherein the second vector representation of the second keyword is generated to correspond to a second context associated with the second keyword, wherein the first context corresponds to a first plurality of keywords that accompany the first keyword in a corpus of text, wherein the second context corresponds to a second plurality of keywords that accompany the second keyword in the corpus of text, and wherein the first keyword and the second keyword are determined to be similar based at least on a similarity between the first context and the second context.

16. The method of claim 15, wherein the first vector representation and the second vector representation are generated by at least applying a word2vec word embedding technique.

17. A non-transitory computer readable medium storing instructions, which when executed by at least one data processor, result in operations comprising:
receiving, at a messaging controller, a first message from a first client device;
matching, by the messaging controller and based at least on a similarity between a first keyword included in the first message and a second keyword included in a first profile of a second user, the first message with the second user, the first keyword being determined to be similar to the second keyword based at least on a distance between a first vector representation of the first keyword and a second vector representation of the second keyword not exceeding a threshold value;
in response to the first message being matched with the second user, enriching the first message by at least
sending, to a bot connector communicatively coupled with one or more bots interfacing with one or more third party platforms, the first message for modification by the one or more third party platforms, the modification including an availability of the first user and/or the second user, and
sending, by the messaging controller, the enriched first message to a second client device associated with the second user, the messaging controller sending the first message while concealing a first identity of the first user as a source of the first message, and the messaging controller routing, based at least on a first communication data including a first client application and a first user identifier of the second user, the first message to the second client device while concealing the first communication data of the second user from the first client device; and
in response to receiving, from the second client device, a second message responsive to the first message,
matching, by the messaging controller and based at least on a similarity between a third keyword included in the second message and a fourth keyword included in a second profile of a third user, the second message with the third user;
sending, by the messaging controller, the second message to the first client device and a third client device of the third user, the messaging controller sending the second message while concealing a second identity of the second user as a source of the second message, the messaging controller routing, based at least on a second communication data of the first user and a third communication data of the third user, the second message to the first client device and the third client device while concealing the second communication data or the third communication data to the second client device.

* * * * *